(12) United States Patent
Rangan et al.

(10) Patent No.: US 11,897,625 B2
(45) Date of Patent: *Feb. 13, 2024

(54) RISK ASSESSMENT FRAMEWORK

(71) Applicant: Federal Express Corporation, Memphis, TN (US)

(72) Inventors: Suresh Rangan, Frisco, TX (US); James L. Bowman, Germantown, TN (US); Robert E. Fisher, Collierville, TN (US)

(73) Assignee: Federal Express Corporation, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,942

(22) Filed: May 23, 2022

(65) Prior Publication Data

US 2022/0281616 A1    Sep. 8, 2022

Related U.S. Application Data

(63) Continuation of application No. 16/844,419, filed on Apr. 9, 2020, now Pat. No. 11,338,934, which is a
(Continued)

(51) Int. Cl.
*G08B 23/00* (2006.01)
*B64D 45/00* (2006.01)
(Continued)

(52) U.S. Cl.
CPC .............. *B64D 45/00* (2013.01); *G06Q 10/04* (2013.01); *G08G 5/003* (2013.01); *G08G 5/0013* (2013.01)

(58) Field of Classification Search
CPC ...... B64D 45/00; G06Q 10/04; G08G 5/0013; G08G 5/003; G08G 5/0034; G08G 5/0039; G08G 5/0052; G08G 5/006
(Continued)

(56) References Cited

U.S. PATENT DOCUMENTS 6,289,277 B1    9/2001    Feyereisen
6,480,770 B1    11/2002    Wischmeyer
(Continued)

FOREIGN PATENT DOCUMENTS

CN    101194286    6/2008
CN    101770602    7/2010
(Continued)

OTHER PUBLICATIONS

Authorized Officer Agnes Wittmann-Regis, International Preliminary Report on Patentability for International Application No. PCT/US2015/055713, dated May 26, 2017, 7 pages.
(Continued)

*Primary Examiner* — Anh V La
(74) *Attorney, Agent, or Firm* — Fish & Richardson P.C.

(57) ABSTRACT

Methods, systems, and apparatus, including computer programs encoded on a computer storage medium, for receiving data related to a first flight risk factor and a second flight risk factor where the first and second risk factors include one of: a proficiency risk factor, an equipment risk factor, an environmental risk factor, or a performance risk factor. Applying a first weighting to the first flight risk factor to generate a first weighted flight risk factor, and applying a second weighting to the second flight risk factor to generate a second weighted flight risk factor. Assessing a flight risk level for a flight based on the first weighted flight risk factor and the second weighted flight risk factor. Providing data indicating the assessed flight risk level for the flight for display to a user.

20 Claims, 8 Drawing Sheets

Related U.S. Application Data continuation of application No. 15/999,013, filed on Aug. 20, 2018, now Pat. No. 10,647,443, which is a continuation of application No. 15/368,107, filed on Dec. 2, 2016, now Pat. No. 10,053,227, which is a continuation of application No. 14/537,375, filed on Nov. 10, 2014, now Pat. No. 9,540,118.

(51) Int. Cl.
*G08G 5/00* (2006.01)
*G06Q 10/04* (2023.01)

(58) Field of Classification Search
USPC .............. 340/963, 945, 958, 964, 971, 906
See application file for complete search history.

(56) References Cited

U.S. PATENT DOCUMENTS

| | | | |
|---|---|---|---|
| 6,940,426 | B1 | 9/2005 | Vaida |
| 6,992,626 | B2 | 1/2006 | Smith |
| 7,324,954 | B2 | 1/2008 | Calderro |
| 8,554,459 | B2 | 10/2013 | Johnson |
| 8,665,121 | B2 | 3/2014 | Shavit |
| 8,843,303 | B1 | 9/2014 | Young |
| 9,540,118 | B2 | 1/2017 | Rangan |
| 10,053,227 | B2 | 8/2018 | Rangan |
| 11,338,934 | B2 * | 5/2022 | Rangan .................. B64D 45/00 |
| 2003/0065428 | A1 | 4/2003 | Mendelson et al. |
| 2004/0199445 | A1 | 10/2004 | Eder |
| 2005/0256682 | A1 | 11/2005 | Galutia et al. |
| 2009/0024357 | A1 | 1/2009 | Aso |
| 2009/0204453 | A1 | 8/2009 | Cooper et al. |
| 2010/0145552 | A1 | 6/2010 | Herman et al. |
| 2011/0301829 | A1 | 12/2011 | White |
| 2012/0218127 | A1 * | 8/2012 | Kroen .................. G08G 5/0052 340/945 |
| 2013/0166607 | A1 * | 6/2013 | Turk ...................... G06Q 50/14 707/E17.032 |
| 2013/0226452 | A1 | 8/2013 | Watts |
| 2014/0032103 | A1 | 1/2014 | Kolbe et al. |
| 2014/0278615 | A1 | 9/2014 | Ince |
| 2016/0004969 | A1 | 1/2016 | Cetinich |
| 2016/0130013 | A1 | 5/2016 | Rangan et al. |
| 2017/0081041 | A1 | 3/2017 | Rangan et al. |
| 2019/0009923 | A1 | 1/2019 | Rangan |

FOREIGN PATENT DOCUMENTS

| | | |
|---|---|---|
| CN | 102456158 | 5/2012 |
| CN | 102609787 | 7/2012 |
| CN | 103810907 | 5/2014 |
| EP | 3218855 | 9/2017 |
| JP | 2009-176058 | 8/2009 |
| JP | 2014-025931 | 2/2014 |
| JP | 2014-151910 | 8/2014 |
| WO | WO 2013/162839 | 10/2013 |
| WO | WO 2016/077024 | 5/2016 |

OTHER PUBLICATIONS

Authorized Officer Claude Berthon, International Search Report and Written Opinion for International Application No. PCT/US2015/055713, dated Dec. 22, 2015, 11 pages.

Evangelos Triantaphyllou et al., "Using the Analytic Hierarchy Process for Decision Making in Engineering Applications: Some Challenges," International Journal of Industrial Engineering: Applications and Practice, vol. 2, No. 1, 1995, pp. 35-44.

H. A. P. Blom et al: "Accident Risk Assessment for Advanced Air Traffic Management", National Aerospace Laboratory NLR, NLR-TP-2001-642, Dec. 31, 2001, Retrieved from the Internet: <http://reports.nlr.nl/xmlui/bitstream/handle/10921/8O7/TP-2OO1-642.pdf?sequence=1>, 27 pages.

Hadjimichael et al., "A fuzzy expert system for aviation risk assessment", Expert Systems With Applications, Oxford, GB, 36(3): 6512-6519, 2009.

Henk Blom et al: "Collision risk modeling of air traffic", 2003 European Control Conference (ECC), IEEE, Sep. 1-4, 2003, pp. 2236-2241.

Japanese Office Action in Application No. 2017-525039, dated Jun. 22, 2020, English Translation, 4 pages.

Japanese Office Action in Application No. 2017-525039, dated Sep. 9, 2019, 3 pages.

U.S. Department of Transportation, Federal Aviation Administration, "Flight Risk Assessment Tool," Information for Operators, InFO 07015, Jul. 3, 2007, 5 pages.

U.S. Department of Transportation, Federal Aviation Administration, FAA/Industry Training Standards, Personal and Weather Risk Assessment Guide, Version 1.0, Oct. 2003, 18 pages.

* cited by examiner

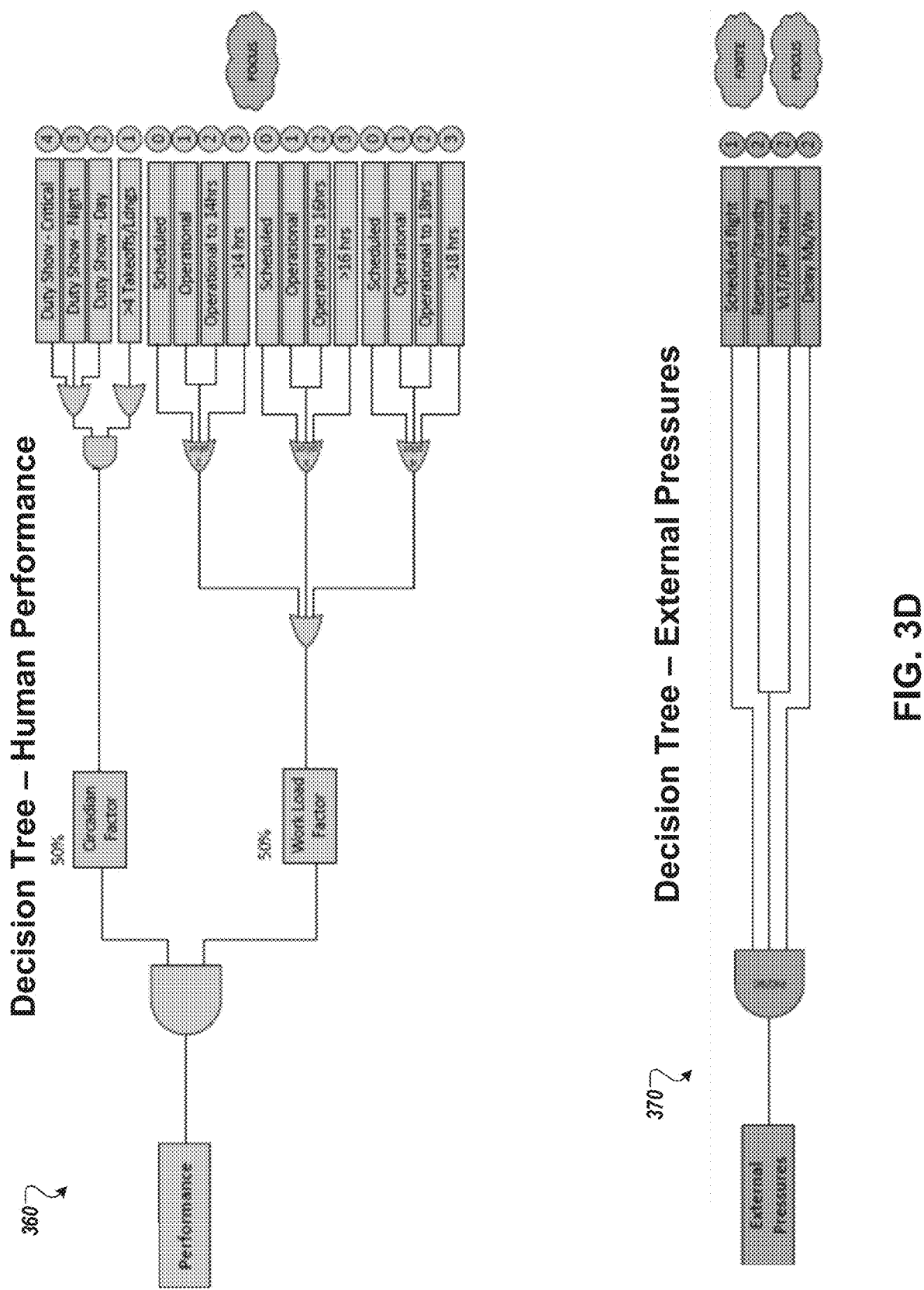

RISK ASSESSMENT FRAMEWORK

CROSS REFERENCE TO RELATED APPLICATIONS

This application is a continuation application of U.S. patent application Ser. No. 16/844,419, filed on Apr. 9, 2020, which is a continuation application of U.S. patent application Ser. No. 15/999,013, filed on Aug. 20, 2018, now U.S. Pat. No. 10,647,443, which is a continuation application of U.S. patent application Ser. No. 15/368,107, filed on Dec. 2, 2016, now U.S. Pat. No. 10,053,227, which is a continuation application of U.S. patent application Ser. No. 14/537,375, filed on Nov. 10, 2014, now U.S. Pat. No. 9,540,118, all of which are hereby incorporated by reference in their entirety.

BACKGROUND

This disclosure relates generally to electronic systems and more particularly to the systems for evaluating risks related to complex logistical operations. The risks associated with complex logistical operations, such as air-traffic control and flight scheduling, are numerous and interrelated. Consequently, a comprehensive evaluation of these risks is not usually available in real-time.

SUMMARY

This specification relates to performing risk assessments on complex logistical operations.

Implementations of the present disclosure generally provide a risk evaluation framework that may be designed to evaluate risk levels associated with a plurality of logistical operations based on comprehensive and interrelated sets of risk factors. For example, the risk evaluation framework may be configured to evaluate a risk level associated with each of an airline's scheduled flights for a given day, and may, thus, aid operational planners in improving the safety of each flight.

In general, innovative aspects of the subject matter described in this specification can be embodied in methods that include actions of receiving data related to a first flight risk factor and a second flight risk factor where the first and second risk factors include one of: a proficiency risk factor, an equipment risk factor, an environmental risk factor, or a performance risk factor. Applying a first weighting to the first flight risk factor to generate a first weighted flight risk factor, and applying a second weighting to the second flight risk factor to generate a second weighted flight risk factor. Assessing a flight risk level for a flight based on the first weighted flight risk factor and the second weighted flight risk factor. Providing data indicating the assessed flight risk level for the flight for display to a user. Other implementations of this aspect include corresponding systems, apparatus, and computer programs, configured to perform the actions of the methods, encoded on computer storage devices.

These and other implementations can each optionally include one or more of the following features. The actions may include ranking the flight among a plurality of flights within a list of flights based on the flight's flight risk level, and providing data indicating a rank of the flight among the plurality of flights within the list of flights for display to the user. The first flight risk factor may include one or more risk sub-factors. The first weighting may be based on a value of at least one of the one or more risk sub-factors. The first and second risk factors may each include one or more risk sub-factors including at least one of: proficiency risk sub-factors, equipment risk sub-factors, environment risk sub-factors, human performance risk sub-factors, and external pressure risk sub-factors.

The actions may include identifying a specific one of the first and second risk factor as being adjustable, determining that adjusting the specific one of the first and second risk factor would reduce the flight risk level of the flight, and providing data indicating a recommendation to adjust the specific one of the first and second risk factor for display to the user. The actions may include determining a specific adjustment to the specific one of the first and second risk factor which would reduce the flight risk level of the flight, and the data indicating a recommendation to adjust the specific one of the first and second risk factor may include a recommendation to make the specific adjustment.

In general, other innovative aspects of the subject matter described in this specification can be embodied in system that includes a first risk factor evaluation module configured to evaluate a first flight risk factor, a second risk factor evaluation module configured to evaluate a second flight risk factor, and a flight risk assessment module communicatively coupled to the first risk factor evaluation module and the second risk factor evaluation module. The risk assessment module being configured to apply a first weighting to the first flight risk factor to generate a first weighted flight risk factor, and a second weighting to the second flight risk factor to generate a second weighted flight risk factor, assess a flight risk level for aircraft flights based on the first weighted flight risk factor and the second weighted flight risk factor, and provide data indicating the assessed flight risk levels for flights for display to a user.

This and other implementations can each optionally include one or more of the following features. A flight risk ranking module communicatively coupled to the flight risk assessment module and configured to receive the data indicating the assessed flight risk level for flights from the flight risk assessment module, and to rank the flights based on the flight risk levels.

The details of one or more implementations of the subject matter described in this specification are set forth in the accompanying drawings and the description below. Other features, aspects, and advantages of the subject matter will become apparent from the description, the drawings, and the claims

BRIEF DESCRIPTION OF THE DRAWINGS

FIGS. 3A-3D are diagrams of example decision trees for evaluating risk factors in accordance with example implementations;

DETAILED DESCRIPTION

In some implementations described below, a risk evaluation framework may be designed to evaluate risk levels associated with a plurality of logistical operations based on comprehensive and interrelated sets of risk factors. For example, the risk evaluation framework may be configured to evaluate a risk level associated with each of an airline's scheduled flights for a given day, and may, thus, aid operational planners in improving the safety of each flight.

Figure 1:
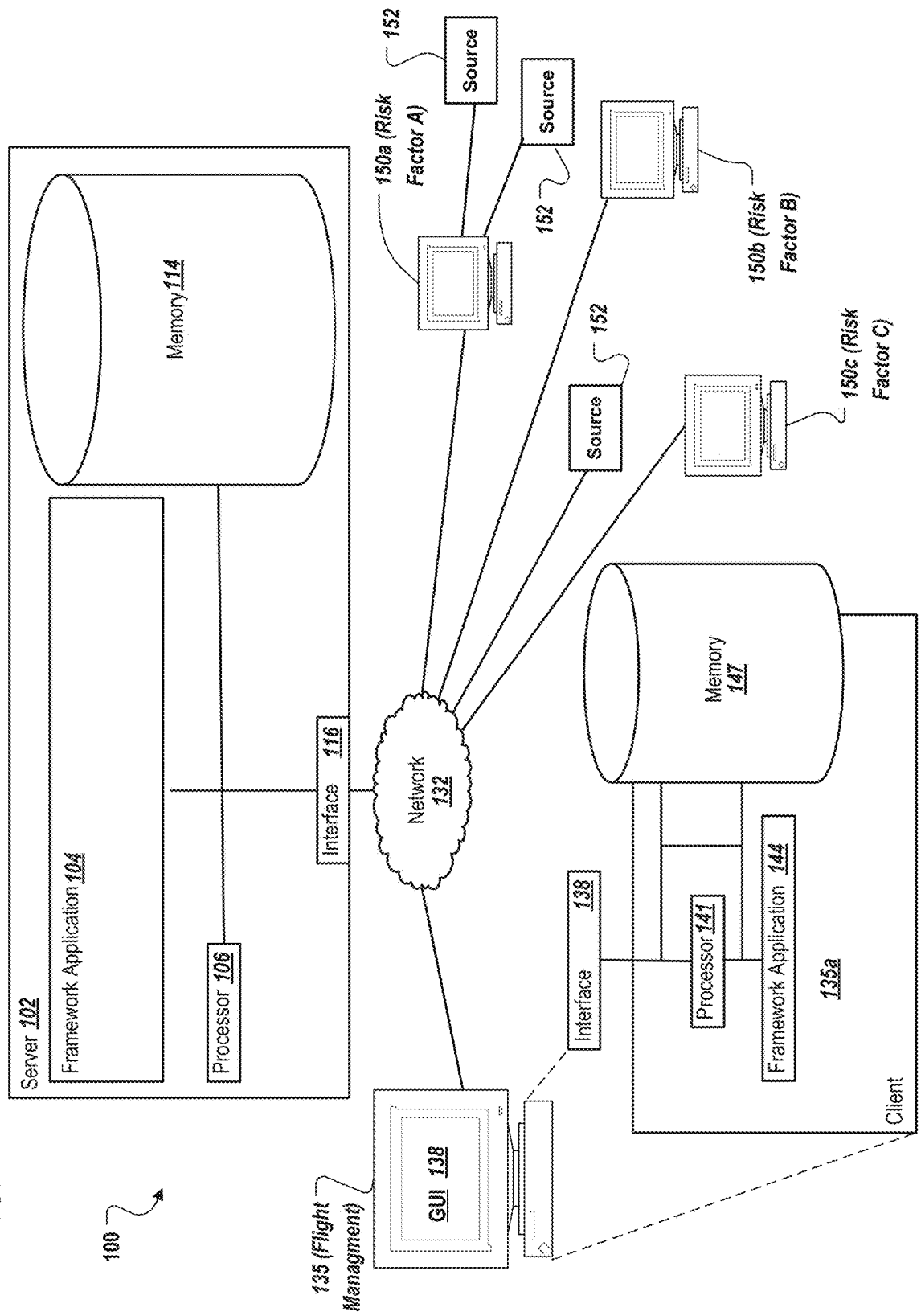
FIG. 1 is a block diagram of an example risk assessment framework system in accordance with an example implementation.

Turning to the example implementation of FIG. 1, the illustrated system 100 includes or is communicably coupled with a server 102, one or more clients 135, and one or more computing devices 150, at least some of which communicate across network 132. In general, the system 100 depicts an example configuration of a system capable of providing a risk analysis framework via the server 102 and computing devices 150 to the clients 135.

In general, the server 102 is any server that stores one or more applications, such as the framework application 104. The framework application may be executed as software or hardware. In some instances, the server 102 may store a plurality of applications in addition to the framework application 104, while in other instances, the server 102 may be a dedicated server meant to store and execute only the framework application 104. In some instances, the server 102 may comprise a web server, where the framework application 104 is one or more web-based applications accessed and executed via network 132 by client 135 of the system 100 to perform the programmed tasks or operations of the framework application 104.

At a high level, the server 102 comprises an electronic computing device operable to receive, transmit, process, store, or manage data and information associated with the system 100. As used in the present disclosure, the term "computer" or "computing device" is intended to encompass any suitable processing device. For example, although FIG. 1 illustrates a single server 102, system 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general-purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with an air traffic control system or a flight management system.

In some implementations, and as shown in FIG. 1, the server 102 includes a processor 106, an interface 116, a memory 114, and framework application 104. The interface 116 is used by the server 102 for communicating with other systems in a client-server or other distributed environment (including within system 100) connected to the network 132 (e.g., client 135, as well as other systems communicably coupled to the network 132). Generally, the interface 116 comprises logic encoded in software and/or hardware in a suitable combination and operable to communicate with the network 132. More specifically, the interface 116 may comprise software supporting one or more communication protocols associated with communications such that the network 132 or interface's hardware is operable to communicate physical signals within and outside of the illustrated system 100.

Generally, the network 132 facilitates wireless or wireline communications between the components of the system 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients.

In still other examples, the network 132 may include a messaging backbone. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102. Further, all or a portion of the network 132 can comprise either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated system 100.

The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 106. Although illustrated as a single processor 106 in FIG. 1, two or more processors may be used according to particular needs, desires, or particular embodiments of system 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of server 102 and, specifically, framework application 104. Specifically, the server's processor 106 executes the functionality required to receive and respond to requests from the clients 135 and their respective client framework applications 144, as well as the functionality required to perform the other operations of the framework application 104.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The framework application 104 may be implemented may be implemented as Enterprise Java Beans (EJBs) or designtime components and may have the ability to generate run-time implementations into different platforms, such as J2EE (Java 2 Platform, Enterprise Edition), ABAP (Advanced Business Application Programming) objects, or Microsoft's .NET, among others. Additionally, the framework application 104 may be a web based application accessed and executed by remote client 135 or client framework application 144 via the network 132 (e.g., through the Internet). Further, while illustrated as internal to server 102, one or more processes (or modules) associated with a framework application 104 may be stored, referenced, or executed remotely. For example, a portion of the framework application 104 may be a web service associated with the application that is remotely called, while another portion of framework application 104 may be an interface object or agent bundled for processing at a remote client 135. Still further, portions of the framework application 104 may be executed by a user working directly at server 102, as well as remotely at client 135.

The server 102 also includes memory 114. Memory 114 may include any memory or database module and may take the form of volatile or non-volatile memory including, without limitation, magnetic media, optical media, random access memory (RAM), read-only memory (ROM), removable media, or any other suitable local or remote memory component. Memory 114 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and the framework application 104. Additionally, memory 114 may include any other appropriate data, such as VPN applications, firmware logs and policies, firewall policies, a security or access log, print or other reporting files, as well as others.

The system 100 may also include one or more clients 135. Each client 135 may be any computing device operable to connect to or communicate with at least the server 102 and/or via the network 132 using a wireline or wireless connection. Further, as illustrated by client 135, a client 135 may include a processor 141, an interface 138, a graphical user interface (GUI) 138, a client application 144, and a memory 147. In general, each client 135 comprises an electronic computer device operable to receive, transmit, process, and store any appropriate data associated with the system 100 of FIG. 1. It will be understood that there may be any number of clients 135 associated with, or external to, system 100. For example, while illustrated system 100 includes one client 135, alternative implementations of system 100 may include multiple clients 135 communicably coupled to the server 102.

Additionally, there may be one or more additional clients 135 external to the illustrated portion of system 100 that are capable of interacting with the system 100 via the network 132. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), a dedicated research terminal, one or more processors within these or other devices, or any other suitable processing device.

Each client 135 may comprise a computer that includes an input device, such as a keypad, touch screen, mouse, or other device that can accept user information, and an output device that conveys information associated with the operation of the server 102 (and framework application 104) or the client 135 itself, including digital data, visual information, the client application 144, or the GUI 138. Both the input and output device may include fixed or removable storage media such as a magnetic or solid state storage media or other suitable media to both receive input from and provide output to users of the clients 135 through the display, namely, the GUI 138. As described above, in many implementations, one or more of the clients may be a networked device or computer system.

As indicated in FIG. 1, the client 135 may be associated with particular users of the system 100. For example, the client 135 may be associated with a flight operations manager. It will also be understood that the system 100 may include a variety of additional clients 135 not illustrated in FIG. 1, such as administrator or network support systems.

Further, the illustrated client 135 includes a GUI 138 comprising a graphical user interface operable to interface with at least a portion of system 100 for any suitable purpose, including generating a visual representation of the client application 144 (in some instances, the client's web browser) and the interactions with the framework application 104, including the responses received from the framework application 104 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in system 100 and efficiently presents the information results to the user.

In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the framework application 104, and may be used (as a web browser or using the client application 144 as a web browser) to view and navigate the framework application 104, as well as various web pages located both internal and external to the server, some of which may be associated with the framework application 104.

For purposes of the present location, the GUI 138 may be a part of or the entirety of the client application 144, while also merely a tool for displaying the visual representation of the client and framework application 104 actions and interactions. In some instances, the GUI 138 and the client application 144 may be used interchangeably, particularly when the client application 144 represents a web browser associated with the framework application 104.

The system 100 may also include one or more computing devices 150. Each client 150 may be any computing device operable to connect to or communicate with at least the server 102 and/or via the network 132 using a wireline or wireless connection. Further, computing devices 150 may be additional servers, additional client devices, or hardware or software modules incorporated into server 102. Computing devices 150, generally, include a framework application (or perform various aspects of framework application 104) or computer code and/or routines defining risk evaluation methods. In some implementations, computing devices 150 may include a processor, an interface, a graphical user interface (GUI), a risk evaluation application, and memory. In general, each client 135 comprises an electronic computer device or computer coded software module of framework application 104 operable to receive, transmit, process, and store any appropriate data associated with the system 100 of FIG. 1. It will be understood that there may be any number of computing devices 150 associated with, or external to, system 100. For example, while illustrated system 100 includes three computing devices (150a, 150b, and 150c), alternative implementations of system 100 may include multiple clients 135 communicably coupled to the server 102, or any other number suitable to the purposes of the system 100.

Each computing device 150 is communicably coupled to one or more sources 152 of risk factor attributes and is configured to receive and evaluate one or more related risk factor attributes. For example, computing device 150a may receive risk factor attributes related to environmental risk factors, computing device 150b may receive risk factor attributes related to equipment risk factors, and 150c may receive risk factor attributes related to personnel risk factors (e.g., proficiency). Risk factor attribute sources 152 may include servers, databases, client devices, and/or electronic sensors. The sources 152 may also be "smart" or internet enabled devices. For example, the sources 152 may be measurement devices or sensors capable of independent and automatic communication over one or more networks. For example, the sources 152 may be any suitable source of data related to a measured risk factor including, but not limited to, weather monitoring instruments, runway or highway cameras, weather report servers, flight schedules, personnel schedules, personnel performance databases, personnel training databases, equipment schedules, databases of equipment maintenance record, and personnel biological monitoring servers or devices. Furthermore, each computing device 150 may communicate with risk factor attribute sources 152 directly (e.g., through a direct wired or wireless communication channel) or via network 132.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
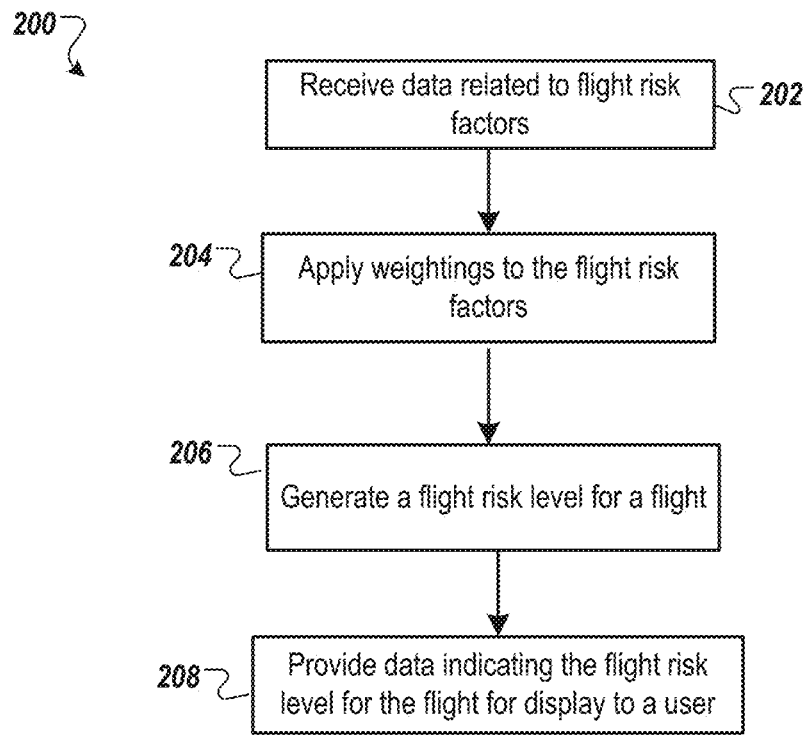
FIG. 2 is a flow chart of an example process for evaluating risk factors in accordance with example implementations.

FIG. 2 is a flow chart of example process 200 for automatically aggregating and evaluating risk factors. In some implementations, the process 200 may be performed by the framework application 104 on server 102 and/or client application 144 on client 135. Process 200 is described in relation to evaluating the risks associated with airline flights; however, process 200 may be applicable to evaluating risks associated with other complex logistical operations as well. As shown in FIG. 2, the process 200 may begin by receiving data related to flight risk factors, as shown in block 202. For example, server 102 may receive data related to one or more flight risk factors from computing devices 150. In some implementations, server 102 may send a request for flight risk factor data to one or more of computing devices 150a-150c and receive the flight risk data in a response to the request (e.g., "pull" the data). For example, server 102 may periodically request data that does not change frequently such as crew training record data. In some implementations, computing devices 150 may send flight risk data to server 102 without having received a request (e.g., "push" the data). For example, computing devices 150 may proactively send data updates as the flight risk data changes, for instance, weather data. Flight risk factor data may include information related to flight crew proficiency, equipment status and maintenance, environment, flight crew performance, and external pressures (e.g., cargo load). Flight risk factors are described in more detail below in relation to the decision trees illustrated in FIGS. 3A-3D.

As shown in step 204, the next step in process 200 may involve applying weightings to the flight risk factors. For example, each of the received risk factors may be weighted based on its overall contribution to the total risk level for a flight. In addition, the weightings applied may be static or dynamic. For instance, in some implementations or for some risk factors, one or more weightings may be preconfigured based on a historical or statistical analysis of the contribution of the one or more risk factors to the riskiness of a flight. In some implementations or for some risk factors, one or more weightings may be dynamically adjusted based on the value, presence, or absence of other risk factors (the other risk factors affecting a given dynamic weighting may even include the risk factor being weighted by the dynamic weighting). For example, the weight applied to a flight crew experience risk factor may be adjusted based on a weather risk factor. More specifically, a pilot's experience level may be more important in poor weather conditions. Therefore, if, for example, a weather risk factor indicates hazardous weather conditions a weighting associated with the pilot's level of experience flying in hazardous weather may be increased. In addition, dynamic weightings may be updated in real-time as their related risk factors change (e.g., weightings related to environmental risk factors).

In some implementations, a weight may include a baseline weight that is preconfigured and based on a general underlying risk for a respective risk factor. Modifications to the baseline weight may be made based on changes to one or more risk factors. For example, if a particular aircraft has a particular maintenance status that may affect a landing during poor conditions a weighting corresponding to an appropriate risk factor (e.g., a proficiency risk factor) may be modified to reflect the increased risk associated with a lesser qualified pilot flying the particular aircraft.

As shown in step 206, the next step in process 200 may involve generating a flight risk level for a flight based on the weighted flight risk factors. For example, a flight risk level may be generated by combining some or all of the weighted risk factors associated with a flight (e.g., by an adaptive learning system). A flight risk level may be a scaled risk score representing the risk associated with a particular flight, for example, a score on a scale of 0-1.0, 0-10, or any appropriate scale. Similarly, the flight risk score may be a risk probability expressed as a fraction or percentage.

As shown in step 208, the next step in process 200 may involve providing data indicating the flight risk level for the flight for display to a user (e.g., a flight operations manager). For example, flight risk levels for one or more flights may be sent to client 135 for display to a user (e.g., a flight operations manager) in a GUI such as GUI 138 illustrated in FIG. 5 and described below. In some implementations, additional data also may be sent with the flight risk level data, for example, recommended adjustments to a flight that may reduce the flight's flight risk level, a detailed analysis of a flight risk level (e.g., predominate risk factors affecting a flight risk level), a confidence score associated with a flight risk level, and/or a mapping or list of other flights affecting the flight risk level of a particular flight.

Although process 200 is described in relation to evaluating a flight risk level for a single flight, generally, the process may be repeated for numerous flights. For example, process 200 may be performed for all of the flights departing from and arriving at a particular airport or for all of an airline's scheduled flights for a given day. The flights may then be ranked based on their flight risk level. In some implementations, process 200 may be performed repeatedly, and hence, may be automatically updated in real-time as risk factor data changes, for example, as weather conditions change.

Figure 3A:
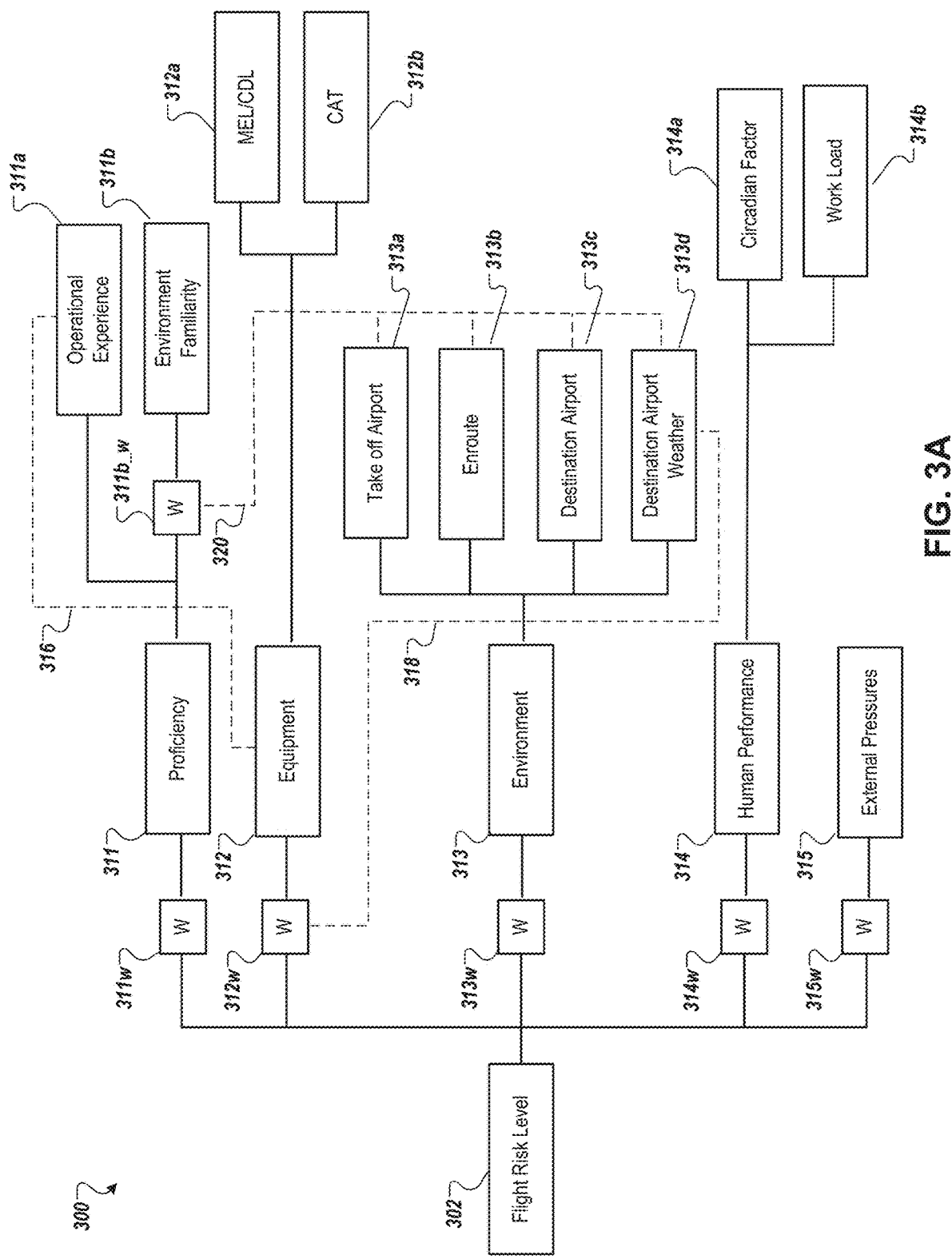

FIG. 3A is an example decision tree 300 illustrating a possible implementation of process 200 for automatically aggregating and evaluating flight risk factors. In some implementations, the decision tree 300 may be implemented by the framework application 104 on server 102 and/or client application 144 on client 135, for example, during process 200. Decision tree 300 represents a process for aggregating and evaluating flight risk factors at a high level of abstraction. Decision tree 300 includes a flight risk level 302 evaluated based on several risk factors (311-315), with some of the risk factors (311-314) being evaluated based on one or more risk sub-factors (311a, 311b, 312a, 312b, 313a-313d, 314a, and 314b). Decision tree 300 also includes several weightings (311w-315w) which may be applied to risk factors (311-315), respectively, and weighting 311b_w applied to risk sub-factor 311b. Dashed lines 316, 318 and 320 indicate a dependent relationship between elements of the decision tree 300. For instance, the values of some risk factors (e.g., 312), risk sub-factors (e.g., 311a), and/or some weightings (e.g., 312w and 311b w) may be dependent on other risk factors, risk sub-factors, and/or weightings, as indicated by dashed lines 316, 318, and 320.

In various implementations each of the risk factors (311-314) and risks sub-factors (311a, 311b, 312a, 312b, 313a-313d, 314a, and 314b) may be evaluated by one or more of the computing devices described in reference to FIG. 1. For example, server 102 may receive data related to each of the risks sub-factors (311a, 311b, 312a, 312b, 313a-313d, 314a, and 314b) and, based on the data, evaluate all of the risks sub-factors (311a, 311b, 312a, 312b, 313a-313d, 314a, and 314b), the risk factors (311-314), and the flight risk level 302 for one or more flights. In some implementations, one or more of the computing devices 150 may evaluate some or all of the risks sub-factors (311a, 311b, 312a, 312b, 313a-313d, 314a, and 314b) and/or risk factors (311-315), while server 102 evaluates the flight risk level 302 for one or more flights.

Example risk factors may include proficiency 311 (e.g., proficiency of a flight crew), equipment 312 (e.g., type of aircraft, aircraft maintenance status), environment 313 (e.g., weather conditions at various locations along a planned flight path), human performance 314 (e.g., factors pertaining to one or more crew members' workload and rest cycle), and external pressures 315 (e.g., a crew member volunteering to fly a particular flight or a crew member's personal issues).

Furthermore, each risk factor may be broken down into multiple risk sub-factors. For instance, a proficiency risk factor 311 may be broken into a measure of risks associated with an operational experience risk sub-factor 311a and an environment familiarity risk sub-factor 311b. The operational experience risk sub-factor 311a, for example, may represent a measure of the operational experience that each member of flight crew has in a given aircraft. As such, the value of specific risk factors or risk sub-factors may depend on the value of other risk factors or risk sub-factors. For instance, the value of the operational expertise risk sub-factor 311a will vary based on the type of aircraft designated for a particular flight under the equipment risk factor 312, as indicated by dashed line 316.

Similarly, the equipment risk factor 312 may be broken into a measure of risks associated with an MEL/CDL risk sub-factor 312a and a CAT risk sub-factor 312b. The MEL/CDL risk sub-factor 312a may be a measure of risk for a particular aircraft designated for a particular flight based on the degree to which the aircraft's systems conform to minimum maintenance standards, such as for example, a Minimum Equipment List (MEL) and a Configuration Deviation List (CDL). An MEL is a published list of equipment related to airworthiness and operating regulations that can be inoperative and still allow and acceptable level of safety to be maintained with appropriate conditions and limitation. In other words, the MEL permits operation with inoperative items for a period of time until repairs can be made. A CDL is a list containing certification limitations for aircraft operation with certain airframe parts and engine parts missing. Similarly, the CAT risk sub-factor 312b may represent a measure of risk related to instrumentation and crew qualifications required for landing. For instance, if a landing is scheduled to occur at night or in low visibility the existence of operability or accuracy of specific instrumentation (e.g., Enhanced Ground Proximity Warning System (EGPWS)) and/or the assignment of aircrew members having specific qualifications may lower the risk level for a flight, whereas such instrumentation and/or qualifications may not be as crucial for a landing during good visibility conditions.

The environment risk factor 313 may be broken into a measure of risks associated with environmental risk sub-factors existing at a take-off airport 313a, enroute 313b, at a destination airport 313c, and weather conditions at a destination airport 313d. Example take-off airport risk sub-factors 313a and destination airport risk sub-factors 313c may include a measure of the risks associated with runway conditions, breaking action, cross winds, and controlled flight into terrain (CFIT). The destination airport risk sub-factors 313c also may include a measure of the risks associated with or mitigated by alternate landing airports. Example enroute risk sub-factors 313b may include a measure of the risks associated with a planned flight path and/or the existence of alternate flight paths.

The human performance risk factor 314 may, for example, be broken into a measure of risks associated with circadian risk sub-factors 314a and workload risk sub-factors 314b. Example circadian risk sub-factors 313a may include a measure of the risks associated with the timing and amount of rest or sleep that each member of a flight crew has had prior to a flight. In some implementations, this factor may be measured by electronic biologic sensors worn by crew members and configured to communicate with server 102 via network 132. For example, the biologic sensors (e.g., sources 152) may be any suitable form measurement device or sensor including, but not limited to, activity meters, sleep sensors, actigraph devices, psychomotor vigilance task (PVT) devices, pedometer, body temperature sensors, medical sensors (such as heart rate sensors or blood pressure sensors), light sensors, telemetry sensors, and/or circadian sensors. For example, in some implementations, the biologic sensors (e.g., sources 152) may include a physical sensor configured to communication over a wireless network either by itself or in combination with a smart phone, such as Bluetooth enabled sensor in communication with a smartphone or tablet computer. Example workload risk sub-factors 313a may include a measure of the risks associated with each crew members' work schedule and/or recent work history.

The external pressures risk factor 315 may include a measure of risks associated with the urgency of a given flight, the status of the aircrew assigned to the flight (e.g., reserve, standby, volunteering or drafted to fly extra time), and/or delays related to weather or maintenance.

As noted above, risk factors and risk sub-factors may be weighted based on the contribution of each risk factor or risk sub-factor to the overall flight risk level. Further, some weightings may be adjusted based on the value of one or more risk factors or risk sub-factors. It should be noted that the arrangement risk factors, risk sub-factors, and weightings illustrated in FIG. 3A are exemplary, and as such, various implementations may include additional or fewer elements arranged in alternate configurations.

Figure 3B:
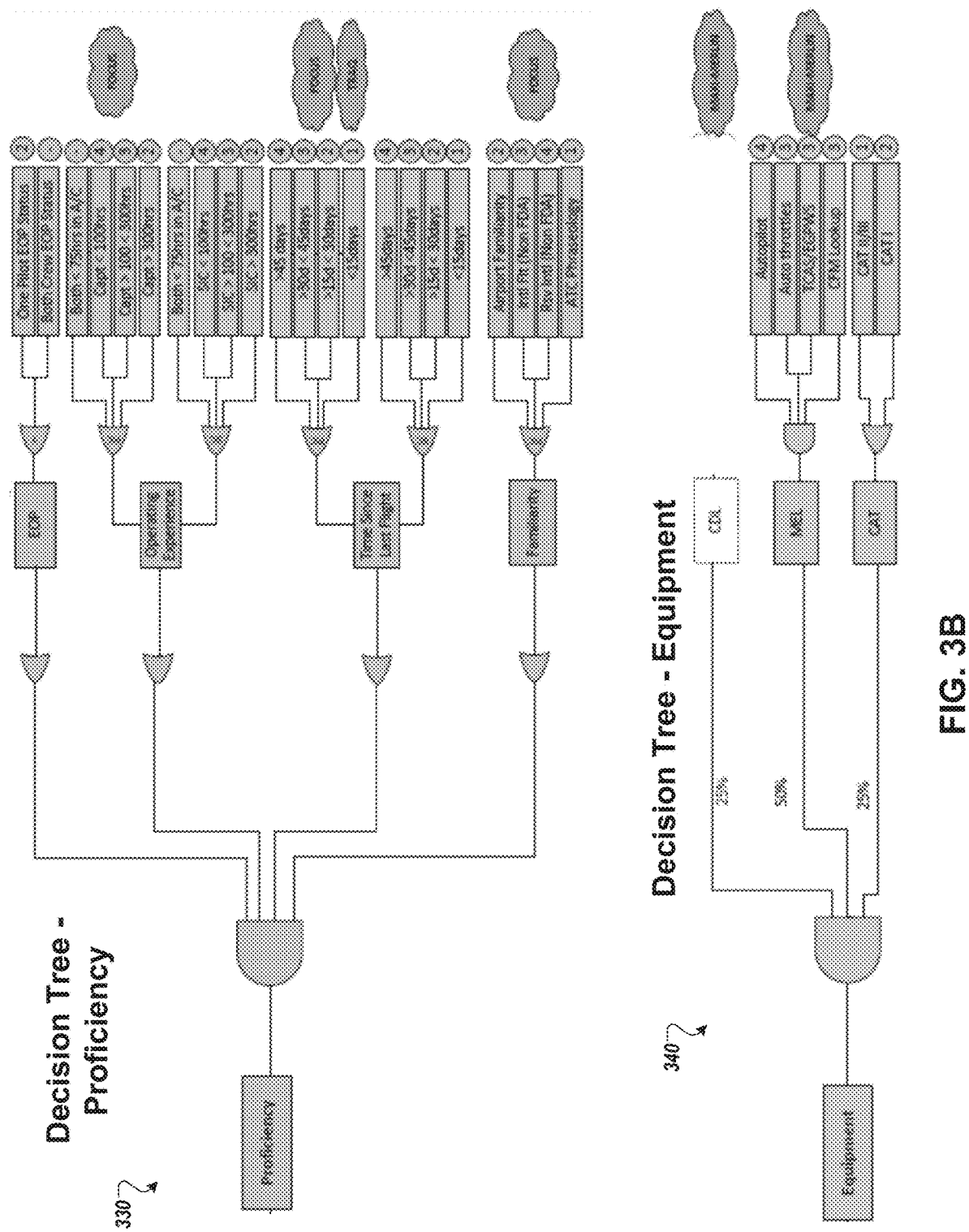
Figure 3C:
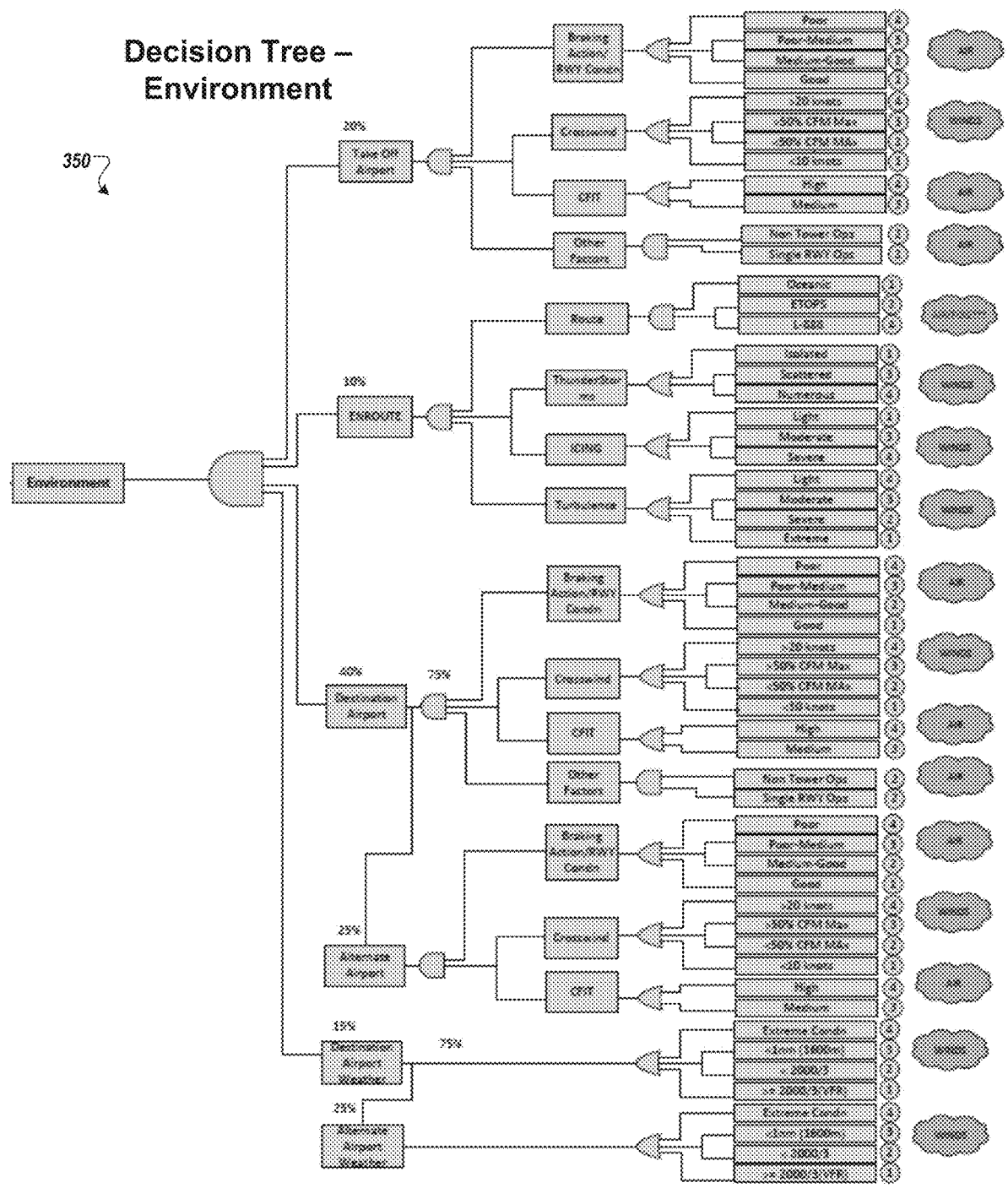

FIGS. 3B-3D are diagrams of example decision trees illustrating methods of automatically evaluating individual risk factors. FIGS. 3B-3D each illustrate a detailed decision tree of an exemplary method for evaluating each of the example risk factors: Proficiency, Equipment, Environment, Human Performance, and External Pressures. FIG. 3B illustrates an exemplary Crew Proficiency risk factor decision tree 330 and an exemplary Equipment risk factor decision tree 340. FIG. 3C illustrates an exemplary Environment risk factor decision tree 350. FIG. 3B illustrates an exemplary Human Performance risk factor decision tree 360 and an exemplary External Pressures risk factor decision tree 370. Again, it should be noted that the arrangement and values of risk factors, risk sub-factors, and weightings illustrated in FIGS. 3B-3D are exemplary, and as such, various implementations may include additional or fewer elements arranged in alternate configurations and with different weighting values.

In some implementations, the decision trees 300, 330, 340, 350, 360, and 370 are updateable in real time. For instance, risk factors and risk sub-factors may be added or removed, weightings may be changed, and relationships between risk factors, risk sub-factors and weightings may be changed, and flight risk levels reevaluated based on the altered decision trees. For instance, results produced by the decision trees may be periodically tested for accuracy using one or more methods (e.g., a Bayesian Algorithms, Analytical Hierarch Processes (AHP), statistical feedback predictive analyses, and/or adaptive learning methods) to improve the decision trees. For example, AHP may be used to remove biases from weightings in the decision tree, statistical feedback predictive analyses may be used to analyze feedback from flight operations, and adaptive learning methods may be used to capture and analyze all of the risk factors occurring during flights.

Figure 4:
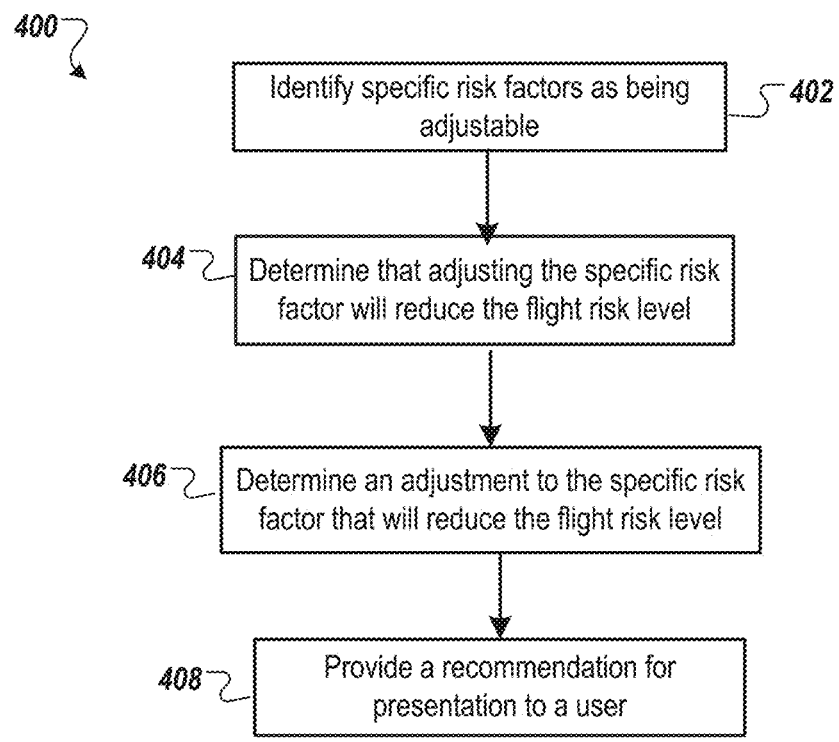
FIG. 4 is a flow chart of an example process for reducing an evaluated risk level in accordance with example implementations.

FIG. 4 is a flow chart of example process 400 for reducing an evaluated risk level associated with a flight. In some implementations, the process 200 may be performed by the framework application 104 on server 102 and/or client application 144 on client 135. Process 400 is described in relation to evaluating the risks associated with airline flights; however, process 400 is applicable to evaluating risks associated with other complex logistical operations as well. As shown in FIG. 4, the process 400 may begin by identifying a specific risk factor as being adjustable, as shown in block 402. For example, risk factors and risk sub-factors related to crew schedules, aircraft and maintenance schedules, and flight plans may be adjustable within certain degrees, whereas risk factors and risk sub-factors related to weather and other environmental conditions, for example, may not be adjustable. Such risk factors or risk sub-factors may be identified within a framework application as adjustable risk factors or risk sub-factors. In addition, the framework application also may determine a possible adjustment range for the adjustable risk factors and risk sub-factors. For example, a specific pilot may only be trained on two different types of aircraft, a risk factor related to crew scheduling would only allow crew scheduling risk factors to be altered to assign the pilot to one of the two aircraft types. Similarly, a given flight plan between New York and Austin may be adjustable to re-route a flight around a storm, however, adjustments to the flight plan may be limited to those that would only extend the overall flight time by one hour due to the departure time of a connecting flight onto which passengers or cargo must be transferred.

As shown in step 404, the next step in process 400 may involve determining that adjusting the specific risk factor will reduce the flight risk level. For example, rerouting or delaying the departure of a particular flight to avoid a storm may reduce environmental risk factors, and thereby, reduce the overall risk level of the flight. In the same way, rescheduling an overworked crew member may reduce human performance risk factors, and thereby, reduce the overall risk level for a flight. In some implementations, the framework application may include an optimization engine to perform statistical analysis on the risk factors associated with each flight and determine appropriate changes to one or more risk factors to reduce the overall risk level for one or more flights. For example, the framework application may perform an iterative process of adjusting flight parameters and monitoring changes in flight risk levels to improve the overall risk level for one or more flights As shown in step 406, the next step in process 400 may involve determining an adjustment to the specific risk factor that will reduce the flight risk level. For example, determining an adjustment to the specific risk factor that will reduce the flight risk level may include determining that a specific adjustment will reduce the flight risk level of Flight A while not adversely impacting the flight risk factor of other flights. For instance, as described above, the framework application may run an iterative process of adjusting one or more risk factors for Flight A, while verifying that the adjustments do not cause the risk level of associated flights to exceed a threshold level. The threshold level may be a maximum flight risk level or a maximum amount of change in each of the associated flights' flight risk level. For example, delaying Flight A may reduce Flight A's flight risk level from 0.60% to 0.45%, but cause Flight B's risk level to increase from 0.21% to 0.23%. A flight risk level change threshold may be set at 0.05%, and therefore, this adjustment to Flight A may be acceptable, whereas an adjustment that increased Flight B's flight risk level to 0.30% would be unacceptable.

In some implementations, the framework application may include a simulation mode in which a user (e.g., a flight operations manager) is permitted to perform temporary "trial" alterations to flight risk factors and reevaluate the overall risk factor for the flight based on the "trial" alterations.

In some implementations, the simulation mode of the framework application may alert the user that a "trial" adjustment adversely affects another flight. In addition, the simulation mode may highlight other flights affected by the "trial" alterations. For instance, delaying swapping co-pilot 1 with co-pilot 2 on Flight A may cause co-pilot 2 to miss a scheduled flight simulator session and increase a related proficiency risk factor for co-pilot 2 next scheduled flight, Flight B. Therefore, in simulation mode, the framework application may alert the user to the affect that such a change has on Flight B. In some implementations, the framework application may not alert the user unless the "trial" adjustment causes the flight risk level of another flight to exceed a threshold, in a manner similar to that explained above.

As shown in step 408, the next step in process 400 may involve providing a recommendation to reduce the flight risk level for presentation to a user (e.g., a flight operations manager). For example, the recommendation may identify a particular flight and recommend a particular adjustment to reduce the flight's flight risk level. In addition, the recommendation may provide detailed statistics regarding how the adjustment affects the particular flight's flight risk level and the flight risk levels of other flights, including any changes to the other flights' flight risk levels. In some implementations, the recommendation may provide a range of potential adjustments and statistics related to the range of adjustments.

Figure 5:
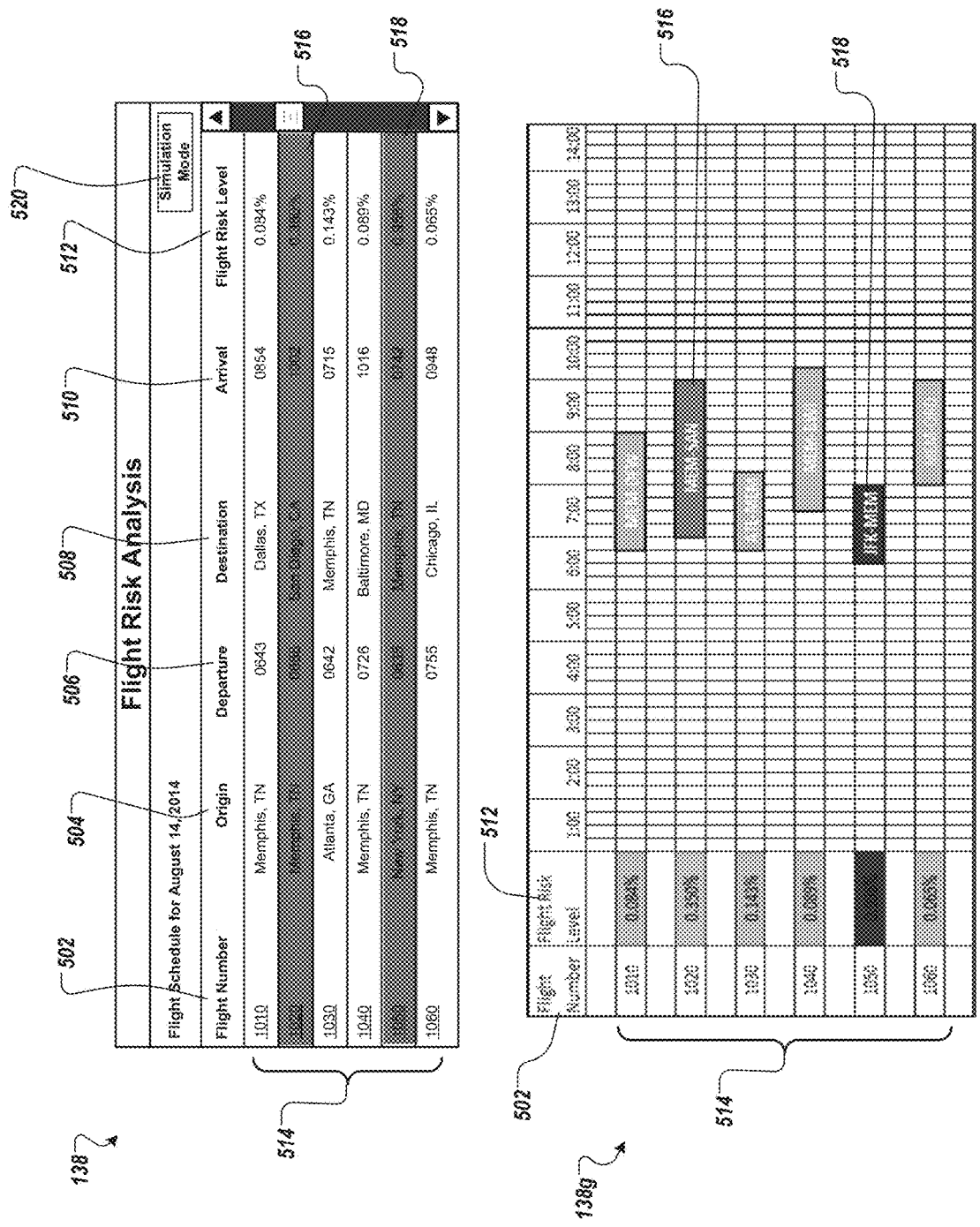
FIG. 5 is a diagram of an example graphical user interface (GUI) for a flight risk analysis framework application in accordance with example implementations.

FIG. 5 is a diagram of example graphical user interfaces (GUI) 138 (and 138g) for a flight risk analysis application, such as, for example, framework application 104 or client application 144. GUI 138 shows a list of flights 514 and associated flight data including an associated flight risk level calculated as described above. The flight data associated with each flight may include flight numbers (column 502), flight origins (column 504), departure times (column 506), flight destinations (column 508), arrival times (column 510), and flight risk levels (column 512). The headings of each column may be user selectable and allow a user to choose a sorting order for the flights based on the selected column. For example, if a user selects the flight risk level column (column 512) the flights may be ranked in order of descending or ascending flight risk level.

In some implementations, GUI 138 may be displayed in a dashboard view. The dashboard view may list just a subset of the flights with the highest flight risk levels, and flights may be ranked in order of flight risk level. In some implementations, GUI 138 may be displayed as a Gant chart (e.g., GUI 138g).

In some implementations, the flight number (column 502) for each flight 514 may be a user selectable link to more detailed information about the selected flight. For example, when a user selects the flight number 514 for Flight 1010, the framework application may display information related to various flight risk factors, such as, a list of the flight crew, the aircraft scheduled for the flight, the aircraft's maintenance status, predicted weather for the flight, and the flight plan.

As described above, some implementations of the framework application may provide a user with recommendations for reducing the flight risk level for a flight and/or alert a user if a flight risk level for a particular flight exceeds a threshold level. The framework application may highlight (516 and 518) flights having an associated recommendation or alert. For example, Flight 1020 is highlighted in a first color (e.g., yellow) 516 indicating that the framework application has generated a recommendation to reduce Flight 1020's flight risk level. Similarly, for example, Flight 1050 is highlighted in a second color (e.g., red) 518 indicating that the framework application has generated an alert associated with Flight 1050. A user may view the recommendation or alert by, for example, selecting the desired flight number in column 502.

Some implementations may include a simulation mode selection button 520 to place the framework application in a simulation mode. While the framework application is in the simulation mode, a user may be able to perform various "trial" adjustments to flight risk factors to improve the flight risk levels, as described above in reference to FIG. 4.

While this document contains many specific implementation details, these should not be construed as limitations on the scope of what may be claimed, but rather as descriptions of features that may be specific to particular implementations or embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

LIST OF ACRONYMS

EOP—Enhanced Oversight Program—A measure of individual crew dynamics, for instance how specific crew members perform together, and may be an independent safety input.
CAPT—Captain
PIC—Pilot in Command—(can also be referred to as a Cap)
SIC—Second in Command—(can also be referred to as a F/O)
F/O—First Officer
RSV—Reserve—an assignment code where a pilot is on the company clock, available to be assigned to an open trip.
FDA—Foreign Duty Assignment—An assignment to a base outside of the US.
CDL—Configuration Deviation List—A list containing certification limitations for aircraft operation with certain airframe parts and engine parts missing.
MEL—Minimum Equipment List—published list of equipment related to airworthiness and operating regulations and other items of equipment that can be inoperative and still allow an acceptable level of safety to be maintained with appropriate conditions and limitations. The MEL permits operation with inoperative items for a period of time until repairs can be made.
TCAS—Traffic collision avoidance system
EGPWS—Enhanced Ground Proximity Warning System
CFM—Cubic feet per minute
CAT—Clear Air Turbulence—a difference in temperature causing a violent movement of the air
CAT I, II, III—Landing minimums and required instruments and crew qualifications
CFIT—Controlled flight into terrain ETOPS—Extended range Twin Operations—Alternate landing airport L-888—Air route between China and Europe through the Himalayas VLT—Volunteer—an assignment status where a pilot request extra flying at time and a half.

DRF—Draft—an assignment status where the company is asking for pilots to fly extra at time and a half MX—Maintenance WX—Weather INTL—International DOM—Domestic FLT—Flight RWY—Runway

The invention claimed is:

1. A computer-implemented method executed by one or more processors, the method comprising:
receiving, by the one or more processors, data related to a plurality of risk factors for a scheduled logistical operation including data related to a first risk factor and data related to a second risk factor, wherein the first risk factor and the second risk factor are each predictive of a safety of the scheduled logistical operation and represent a pre-operation attribute of the scheduled logistical operation;
applying, by the one or more processors, a first weighting to the first risk factor to generate a first weighted risk factor, and a second weighting to the second risk factor to generate a second weighted risk factor, wherein a value of the first weighting is determined based on a first preconfigured weighting and the second weighting is determined based on a second preconfigured weighting, the second preconfigured weighting being different from the first preconfigured weighting;
assessing, by the one or more processors and based, at least partly, on the plurality of risk factors, a risk level for the scheduled logistical operation, the risk level representing a comprehensive riskiness of the scheduled logistical operation; and
providing, by the one or more processors and for display to a user, data indicating the risk level for the scheduled logistical operation.

2. The method of claim 1 further comprising adjusting the value of the first weighting based on a value of a third risk factor.

3. The method of claim 1 further comprising adjusting the value of the first weighting based an absence of a third risk factor.

4. The method of claim 1 further comprising adjusting the value of the first weighting based a presence of a third risk factor.

5. The method of claim 1, wherein the first risk factor and second risk factor each represents one of the following pre-operation attributes of the scheduled logistical operation: an operation crew proficiency risk factor, an equipment risk factor, an environmental risk factor, or a human performance risk factor associated with operation crew members.

6. The method of claim 3, wherein the first preconfigured weighting, the second preconfigured weighting, or both, is based on a statistical analysis of a historical contribution of at least one of the plurality of risk factors to the comprehensive riskiness of the scheduled logistical operation.

7. The method of claim 5, wherein the first preconfigured weighting, the second preconfigured weighting, or both, is based on a respective baseline weight that is based on a general underlying risk for a respective risk factor.

8. The method of claim 1 further comprising:
automatically determining that adjusting at least one risk factor of the plurality of risk factors would reduce the risk level of the scheduled logistical operation; and
providing, for display, data indicating a recommendation to adjust the at least one risk factor.

9. A non-transitory, computer-readable medium storing one or more instructions executable by a computer system to perform operations comprising:
receiving data related to a plurality of risk factors for a scheduled logistical operation including data related to a first risk factor and data related to a second risk factor, wherein the first risk factor and the second risk factor are each predictive of a safety of the scheduled logistical operation and represent a pre-operation attribute of the scheduled logistical operation;
applying a first weighting to the first risk factor to generate a first weighted risk factor, and a second weighting to the second risk factor to generate a second weighted risk factor, wherein a value of the first weighting is determined based on a first preconfigured weighting and the second weighting is determined based on a second preconfigured weighting, the second preconfigured weighting being different from the first preconfigured weighting;
assessing, based, at least partly, on the plurality of risk factors, a risk level for the scheduled logistical operation, the risk level representing a comprehensive riskiness of the scheduled logistical operation; and
providing, for display to a user, data indicating the risk level for the scheduled logistical operation.

10. The non-transitory computer-readable medium of claim 9, wherein the operations further comprise adjusting the value of the first weighting based on a value of a third risk factor.

11. The non-transitory computer-readable medium of claim 9, wherein the operations further comprise adjusting the value of the first weighting based an absence of a third risk factor.

12. The non-transitory computer-readable medium of claim 9, wherein the operations further comprise adjusting the value of the first weighting based a presence of a third risk factor.

13. The non-transitory computer-readable medium of claim 9, wherein the first risk factor and the second risk factor each represents one of the following pre-operation attributes of the scheduled logistical operation: an operation crew proficiency risk factor, an equipment risk factor, an environmental risk factor, or a human performance risk factor associated with operation crew members.

14. The non-transitory computer-readable medium of claim 11, wherein the first preconfigured weighting, the second preconfigured weighting, or both, is based on a statistical analysis of a historical contribution of at least one of the plurality of risk factors to the comprehensive riskiness of the scheduled logistical operation.

15. The non-transitory computer-readable medium of claim 13, wherein the first preconfigured weighting, the second preconfigured weighting, or both, is based on a respective baseline weight that is based on a general underlying risk for a respective risk factor.

16. The non-transitory computer-readable medium of claim 9, wherein the operations further comprise:
automatically determining that adjusting at least one risk factor of the plurality of risk factors would reduce the risk level of the scheduled logistical operation; and
providing, for display, data indicating a recommendation to adjust the at least one risk factor.

17. A system, comprising:
one or more processors; and
a computer-readable storage device coupled to the one or more processors and having instructions stored thereon which, when executed by the one or more processors, cause the one or more processors to perform operations comprising:
   receiving data related to a plurality of risk factors for a scheduled logistical operation including data related to a first risk factor and data related to a second risk factor, wherein the first risk factor and the second risk factor are each predictive of a safety of the scheduled logistical operation and represent a pre-operation attribute of the scheduled logistical operation;
   applying a first weighting to the first risk factor to generate a first weighted risk factor, and a second weighting to the second risk factor to generate a second weighted risk factor, wherein a value of the first weighting is determined based on a first preconfigured weighting and the second weighting is determined based on a second preconfigured weighting, the second preconfigured weighting being different from the first preconfigured weighting;
   assessing, based, at least partly, on the plurality of risk factors, a risk level for the scheduled logistical operation, the risk level representing a comprehensive riskiness of the scheduled logistical operation; and
   providing, for display to a user, data indicating the risk level for the scheduled logistical operation.

18. The system of claim 17, wherein the operations further comprise adjusting the value of the first weighting based on a value of a third risk factor.

19. The system of claim 17, wherein the operations further comprise adjusting the value of the first weighting based an absence of a third risk factor.

20. The system of claim 17, wherein the operations further comprise adjusting the value of the first weighting based a presence of a third risk factor.

* * * * *